(12) United States Patent
Bae et al.

(10) Patent No.: US 7,344,571 B2
(45) Date of Patent: Mar. 18, 2008

(54) HYDROGEN GENERATOR

(75) Inventors: In Tae Bae, Wrentham, MA (US); Javit A. Drake, Waltham, MA (US); Andrew G. Gilicinski, Westborough, MA (US); Matthew R. Stone, Hudson, MA (US); Joseph E. Sunstrom, Merrimack, NH (US)

(73) Assignee: The Gillette Company, Boston, MA (US)

( * ) Notice: Subject to any disclaimer, the term of this patent is extended or adjusted under 35 U.S.C. 154(b) by 582 days.

(21) Appl. No.: 10/640,567

(22) Filed: Aug. 14, 2003

(65) Prior Publication Data

US 2005/0036941 A1   Feb. 17, 2005

(51) Int. Cl.
*B01J 7/00*   (2006.01)
(52) U.S. Cl. .......................... 48/61; 422/129; 422/212; 422/255; 422/305; 422/292; 429/30; 429/40; 429/41; 429/46
(58) Field of Classification Search ................ 422/239, 422/236; 48/61
See application file for complete search history.

(56) References Cited

U.S. PATENT DOCUMENTS

| | | | |
|---|---|---|---|
| 3,133,837 A | 5/1964 | Eidensohn | 429/19 |
| 3,338,746 A | 8/1967 | Plust et al. | 429/9 |
| 3,410,729 A | 11/1968 | Manion | 429/13 |
| 3,649,360 A | 3/1972 | Bloomfield et al. | 429/19 |
| 4,000,003 A | 12/1976 | Baker et al. | 429/7 |
| 4,155,712 A | 5/1979 | Taschek | 422/239 |
| 4,628,010 A | 12/1986 | Iwanciow | 429/19 |
| 5,702,491 A | 12/1997 | Long et al. | 48/197 |
| 5,976,725 A * | 11/1999 | Gamo et al. | 429/25 |
| 6,534,033 B1 | 3/2003 | Amendola et al. | 423/648.1 |
| 6,544,400 B2 * | 4/2003 | Hockaday et al. | 205/338 |
| 6,554,877 B2 | 4/2003 | Finkelshtain et al. | 44/436 |
| 6,645,651 B2 * | 11/2003 | Hockaday et al. | 429/19 |
| 6,746,496 B1 * | 6/2004 | Kravitz et al. | 48/118.5 |

FOREIGN PATENT DOCUMENTS

WO   WO 98/30493   7/1998

OTHER PUBLICATIONS

Schlesinger et al., *J. Am Chem Soc*, 1953, 75, 215.

* cited by examiner

*Primary Examiner*—Alexa Neckel
*Assistant Examiner*—Kaity Handal
(74) *Attorney, Agent, or Firm*—Fish & Richardson P.C.

(57) ABSTRACT

A hydrogen generator includes a housing, a solid hydrogen source disposed within the housing, and an inlet configured to guide a fluid to contact the solid hydrogen source. The inlet can contact a wicking region. The wicking region can include a wicking material that has an affinity for the fluid. The wieking material can include a hydrophilic material. The housing can include a hydrogen gas outlet. The hydrogen generator can include an end cap at one end of the housing including the inlet and the hydrogen gas outlet. The hydrogen gas outlet can include a gas permeable membrane. The inlet can be fluidly connected to a fluid control system configured to control fluid flow rate to the solid hydrogen source. The generator can be portable.

22 Claims, 6 Drawing Sheets

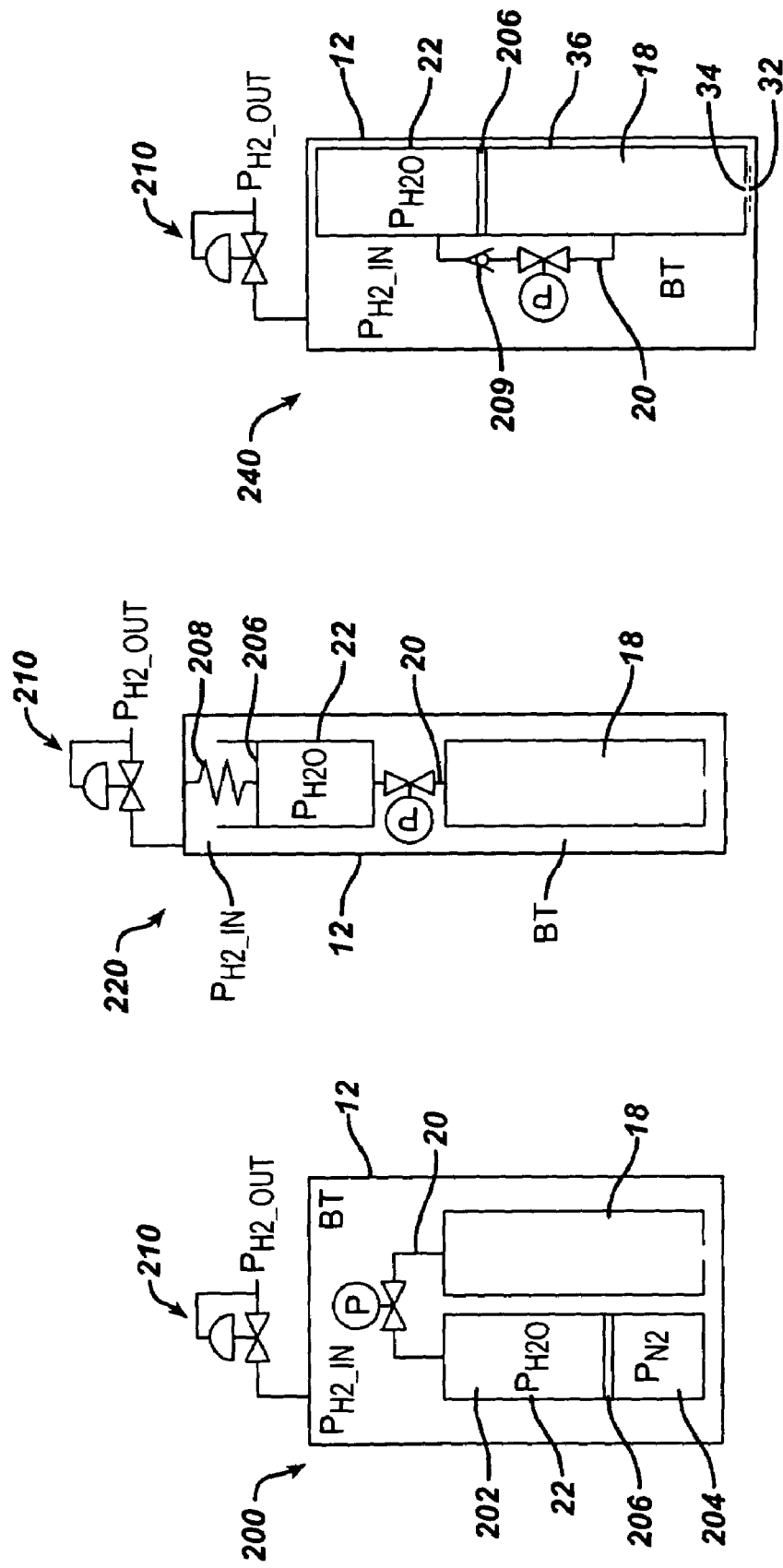

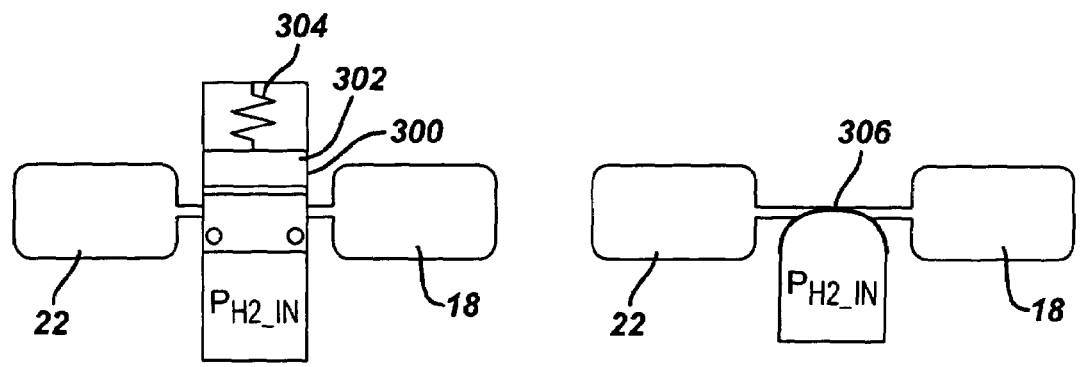
*FIG. 8A*  *FIG. 8B*
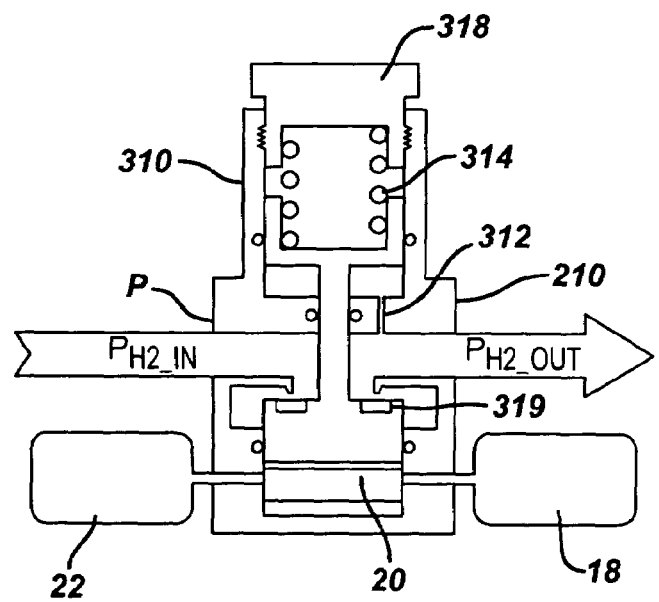
*FIG. 8C*

HYDROGEN GENERATOR

TECHNICAL FIELD

This invention relates to a hydrogen generator.

BACKGROUND

An electrochemical cell is a device capable of providing electrical energy from an electrochemical reaction, typically between two or more reactants. Generally, an electrochemical cell includes two electrodes, called an anode and a cathode, and an electrolyte disposed between the electrodes. In order to prevent direct reaction of the active material of the anode and the active material of the cathode, the electrodes are electrically isolated from each other by a separator.

In one type of electrochemical cell, sometimes called a hydrogen fuel cell, the anode reactant is hydrogen gas, and the cathode reactant is oxygen (e.g., from air). At the anode, oxidation of hydrogen produces protons and electrons. The protons flow from the anode, through the electrolyte, and to the cathode. The electrons flow from the anode to the cathode through an external electrical conductor, which can provide electricity to drive a load. At the cathode, the protons and the electrons react with oxygen to form water. The hydrogen can be generated from a hydrogen storage alloy, by ignition of a hydride, or by hydrolysis of a liquid solution or slurry of a hydride.

SUMMARY

In one aspect, a hydrogen generator includes a housing, a solid hydrogen source disposed within the housing, and an inlet configured to guide a fluid to contact the solid hydrogen source. The inlet can contact a wicking region. The wicking region can include a wicking material that has an affinity for the fluid. The wicking material can include a hydrophilic material. The housing can include a hydrogen gas outlet. The hydrogen generator can include an end cap at one end of the housing including the inlet and the hydrogen gas outlet. The hydrogen gas outlet can include a gas permeable membrane. The inlet can be fluidly connected to a fluid control system configured to control fluid flow rate to the solid hydrogen source. The generator can be portable.

In another aspect, a method of generating hydrogen includes contacting a fluid including a proton source and a solid hydrogen source disposed within a housing having an outlet configured to deliver the hydrogen to a hydrogen fuel cell. The fluid and the solid hydrogen source can be contacted by introducing the fluid into a hydrogen generator. The hydrogen generator can include the housing. The solid hydrogen source and an inlet can be configured to guide the fluid to contact the solid hydrogen source. The method can include dissolving a catalyst in the fluid. In certain circumstances, the method can include passing the fluid through the inlet to a wicking material. The method can also include controlling the amount of fluid reaching the solid hydrogen source, for example, by determining an amount of hydrogen exiting generator. The fluid can include water or another proton source, which can be delivered as water vapor to the solid hydrogen source.

In another aspect, a method of manufacturing a hydrogen generator includes placing a solid hydrogen source in a housing, the housing including an inlet configured to guide a fluid to contact the solid hydrogen source. The method can include forming a housing insert from the solid hydride, for example, by combining the solid hydride with a wicking material. The solid hydride can be combined with the wicking material by constructing a wicking region from the wicking material and a region of the solid hydride. The wicking region can be constructed by forming a channel of the wicking material through the region of the solid hydride or by forming a layer adjacent to the region of the solid hydride, for example, by rolling the layer adjacent to the region of the solid hydride to form a layered roll. The channel can extend along a long axis of the housing, along a radial axis of the housing, or combinations thereof. In certain circumstances, the wicking material can be combined with a catalyst. The method can also include placing an end cap in contact with the solid hydrogen source, the end cap including the inlet and a hydrogen gas outlet. The inlet can be fluidly connected to a fluid control system configured to control fluid flow rate to the solid hydrogen source.

The solid hydrogen source can include a wicking region, for example, of a wicking material such as a hydrophilic material, and a region of a solid hydride. The wicking region can form a layer adjacent to the region of the solid hydride. For example, the wicking region and the region of the solid hydride form a layered roll. The wicking region can be a channel through the region of the solid hydride, which can extend along a long axis of the housing, along a radial axis of the housing, or along both dimensions of the housing. For example, the housing can be cylindrical and the channel can extend along the length of the cylinder.

The solid hydrogen source can include a solid hydride, such as a hydride salt, including an alkali or alkaline earth hydride, an aluminum hydride, or a borohydride. The borohydride can be lithium borohydride, sodium borohydride, potassium borohydride, or mixtures thereof. The solid hydride can be a pellet, tablet, cylinder, layer, or tube. The solid hydride can be combined with a wicking material. For example, the solid hydrogen source can be a blend of the wicking material with the solid hydride. The wicking material can include a catalyst. The fluid can include a proton source capable of reacting within the solid hydrogen source to form hydrogen gas. For example, the proton source can include water.

Embodiments of a hydrogen generator can include one or more of the following advantages. The hydrogen generator can have competitive volumetric and gravimetric capacities relative to other hydrogen sources. For example, a solid hydrogen source increases the volumetric energy density of the generator in comparison to devices based on slurries or solutions of similar materials. The design of wicking regions in the solid hydrogen source can lead to more complete conversion of the materials contained within the generator to hydrogen gas. The hydrogen generator can provide fuel to a fuel cell safely and reliably, and in a controllable manner. The addition of a catalyst throughout the solid hydrogen can control or modulate hydrogen generation throughout the generator, which can decrease the overall running temperature of the generator, and improve safety factors. The components of the hydrogen generator can be relatively inexpensive, compared to the components of other hydrogen sources. The hydrogen generator can be an economical, compact, portable, and/or disposable source of hydrogen gas. The hydrogen generator based on a solid hydride can be of a low weight relative to hydrogen sources employing reversible metal hydride alloys.

Electrochemical cell performance can be improved as well. In particular, solid sodium borohydride to which twice the stoichiometric amount of water was added, has been calculated to yield over a 50% improvement in runtime when compared to lithium ion rechargeable batteries for powering portable consumer electronic devices, using practical numbers for fuel cell system components for such applications. In addition, the optimal solid hydride utilization can be balanced with minimal volume allotted for water infusion and hydrogen recovery, which can be adjusted or modified by the placement of various hydrophobic and wicking materials throughout a solid hydride matrix. This can allow improved utilization of reactants and improved control of hydrogen generation rate.

The details of one or more embodiments are set forth in the accompanying drawings and the description below. Other features and advantages will be apparent from the description and drawings, and from the claims.

DESCRIPTION OF DRAWINGS

FIGS. 7A-C are schematic representations of fluid control systems.

FIGS. 8A-C are schematic representations of fluid control systems.

DETAILED DESCRIPTION

Figure 1:
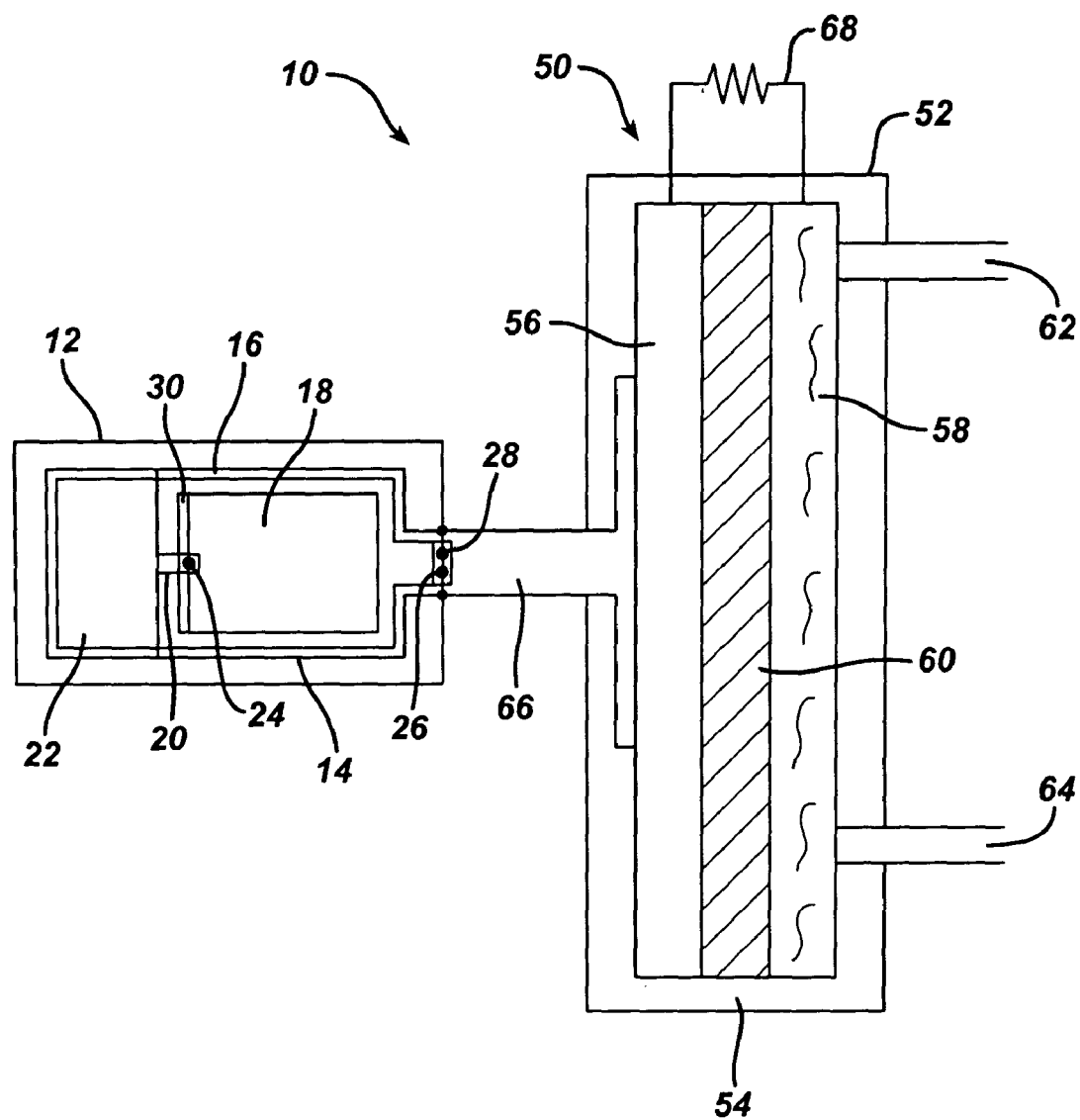
FIG. 1 is a schematic representation of an electrochemical cell.

Referring to FIG. 1, an electrochemical system 10 includes a hydrogen generator 12 includes a housing 14 defining an internal volume 16. Disposed within the internal volume of the hydrogen generator is a solid hydrogen source 18. An inlet 20 is configured to guide a fluid, which is in fluid container 22, to contact the solid hydrogen source 18. The inlet 20 can contact a wicking region 24, for example, of a hydrophilic material, that can be included in the solid hydrogen source 18, The housing 14 can include a hydrogen gas outlet 26, which can be configured to deliver the hydrogen to a hydrogen fuel cell.

Hydrogen gas outlet 26 of housing 14 can include a gas permeable membrane. The membrane can contain any liquid component that could potentially exit through the outlet, thereby helping to limit or prevent fluid leakage from the housing. The gas permeable membrane allows gas, particularly hydrogen gas, to exit the housing unimpeded while preventing solid particles from exiting the hydrogen generation housing by filtration. The gas permeable membrane can include a polymer, such as a poly(alkane), poly(styrene), poly(methacrylate), poly(nitrile), poly(vinyl), fluoropolymer, poly(diene), poly(xylylene), poly(oxide), poly(ester), poly(carbonate), poly(siloxane), poly(imide), poly(amide), poly(urethane), poly(sulfone), poly(aryl ether ether ketone), or cellulose, or a porous materials, such as a fiber or mineral sufficiently hydrophobic and microporous to restrict liquid, yet permit hydrogen permeation, or combinations thereof. Combinations suitable to form a gas permeable membrane include co-polymers, polymer blends, and composites including inorganic-organic composites. Although housing 14 in FIG. 1 has only one hydrogen gas outlet, in some cases the housing has more than one hydrogen gas outlet yet allow unimpeded exit of desired hydrogen gas. To obtain adequate permeation rates, high surface area configurations of the gas permeable membrane, for example, parallel micro-tubes, channels or layers, can be used. The gas permeable membrane(s) can be placed at the outlet 26 of the generator or integrated within the generator.

The hydrogen generator 12 can include an end cap 30 at one end of the housing. End cap 30 includes the inlet 20. In certain embodiments, the end cap 30 includes the hydrogen gas outlet (not shown in FIG. 1). The hydrogen gas outlet can include a gas permeable membrane. Gas permeable hydrophobic material can also be used as a pathway for moist gaseous hydrogen out of the cell.

Housing 14 can be a cylindrical housing. The housing can be made of a metal such as nickel or nickel plated steel, stainless steel, or aluminum-clad stainless steel, or a plastic such as polycarbonate, polyvinyl chloride, polypropylene, a polysulfone, ABS or a polyamide. The housing can have a length of between 1 cm and 30 cm, and a width or diameter of between 1 cm and 20 cm. The housing can have a volume of between 1 $cm^3$ and 9,400 $cm^3$.

The solid hydrogen source can include a solid hydride, such as an alkali or alkaline earth hydride, an aluminum hydride, or a borohydride. The borohydride can be lithium borohydride, sodium borohydride, potassium borohydride, or mixtures thereof. The solid hydride can be a pellet, tablet, cylinder, layer, or tube. In some cases, the solid hydrogen source can include an oxidizable material, such as a metal (e.g., zinc, aluminum, titanium, zirconium, or tin).

The fluid that is guided by the inlet can include a proton source capable of reacting within the solid hydrogen source to generate hydrogen gas. For example, the proton source can include water and the solid hydrogen source can include a solid hydride. A catalyst can be included in the fluid, or added to the fluid as it reacts within the solid hydrogen source to facilitate generation of hydrogen gas. In general, hydrogen is generated by contacting the fluid and the solid hydrogen source. The fluid and the solid hydrogen source can be contacted by introducing the fluid into a hydrogen generator. The amount of fluid reaching the solid hydrogen source can be controlled, for example, by determining an amount of hydrogen exiting generator.

The solid hydrogen source can include a binder. Examples of binders include a polyethylene powder, a polypropylene, a polybutylene, a nylon, a polyacrylamide, a polyacrylate, a polyvinyl chloride, a polystyrene, a polymethylpentene, a Portland cement, or a fluorocarbon resin, such as polyvinylidene fluoride or polytetrafluoroethylene. In certain embodiments, the binder can be a hydrophilic material, such as a fibrous polymer fabric (e.g., polyvinyl alcohol fibers). The solid hydrogen source can include between 0.01% and 10% binder by weight.

The solid hydrogen source can include a wicking material, which can form a portion of the region 24. The wicking material can be a fibrous polymer. The wicking material can include a hydrophilic material. Examples of a hydrophilic material include a nylon, a polyacrylamide, a polyacrylate, a polyvinyl chloride, a substituted polystyrene, or a polyvinyl alcohol. For example, the wicking material can include polyvinyl alcohol fibers. The wicking material can include other additives. For example, the wicking material can include a surfactant (e.g., Triton X-100, available from Sigma-Aldrich). The surfactant can help to wet the wicking material, which can modify the rate of movement of the fluid through the wicking material.

The catalyst can be a component of the fluid or the catalyst can be distributed on, dissolved in, or coated on the wicking material, in which case the catalyst can dissolve in the fluid as the fluid contacts or passes into the solid hydrogen source. The catalyst loading of the wicking material can be between 0.01% by weight and 5% by weight. The catalyst can include a transition metal salt, for example, a ruthenium or cobalt salt, or mixtures thereof. The catalyst can be a water soluble transition metal salt that activates the reaction of water with sodium borohydride, such as cobalt (II) chloride and iron(II) chloride. The catalyst can either be stored in dry form within the solid hydrogen source matrix, as a dry metal or metal salt on an inert support (silica, alumina, zeolite, etc.) dispersed within the solid hydrogen source matrix, distributed within the solid hydrogen source configuration separate from the solid hydrogen source matrix, or introduced as an aqueous solution. Soluble metal salts have high activity due to the high surface area of the catalytic native metal particles produced upon reduction by sodium borohydride. Alternatively, the catalyst surface can be a metal foil which can be co-laminated to the tape to be rolled within the wound cell configuration.

The combination of wicking material and solid hydride in the solid hydrogen source can form a wicking region of the wicking material and a region of a solid hydride. The wicking material can guide or wick the fluid to the solid hydride, which can improve the overall yield of hydrogen gas by more completely consuming the solid hydride in the generator. This can be accomplished by more completely distributing the fluid throughout the volume of the solid hydrogen source.

Figure 2A:
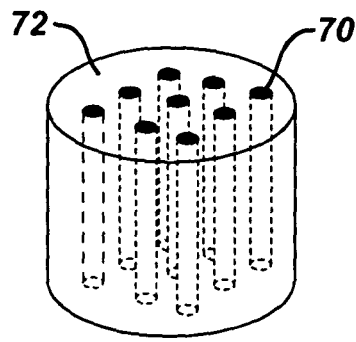
FIG. 2A is a perspective view of solid hydrogen source.
Figure 2B:
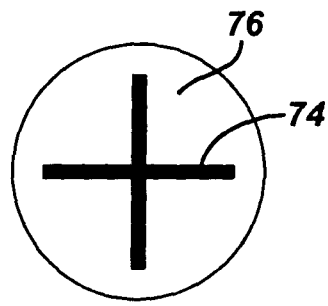
FIG. 2B is a top view of a solid hydrogen source.
Figure 3A:
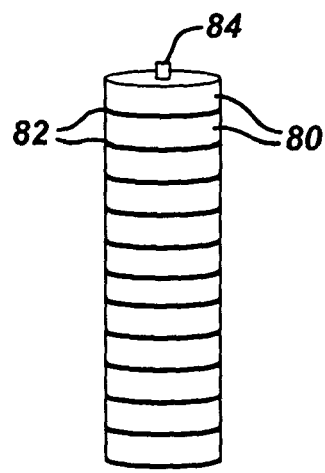
FIGS. 3A and 3C are perspective views of various solid hydrogen sources.
Figure 3B:
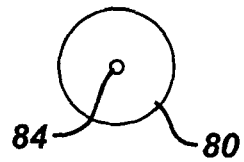
FIGS. 3B and 3D-F are top views of various solid hydrogen sources.
Figure 3C:
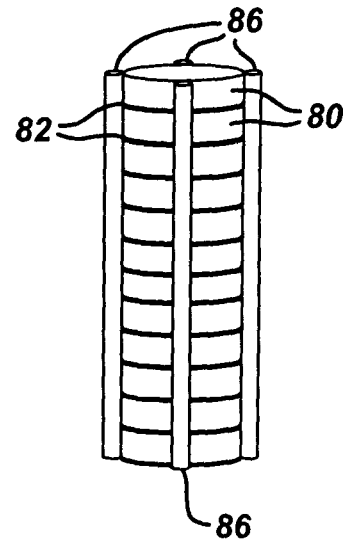
Figure 3D:
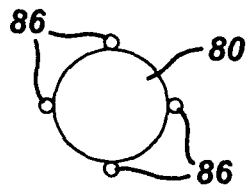
Figure 3E:
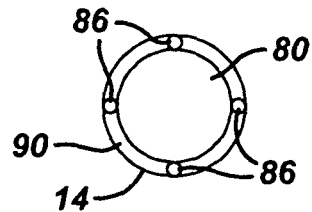
Figure 3F:
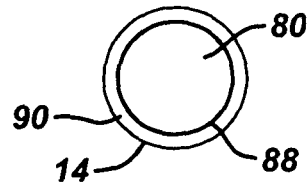

In one example, the wicking region can be incorporated into a channel through the region of the solid hydride, which can extend along a long axis of the housing, along a radial axis of the housing, or along both dimensions of the housing. Referring to FIG. 2A, a channel 70 (or plurality of channels which can be evenly distributed, as shown) can extend along the length of a cylindrical pellet 72 of a solid hydride or a blend of a solid hydride with a binder or additive. Referring to FIG. 2B, a channel 74 can be a groove extending radially through a cylindrical pellet 76, which can also extend along the length of the pellet. Referring to FIGS. 3A-F, tablets 80 can be stacked to form a structure such as a cylinder that is configured to fit within the housing. Referring to FIGS. 3A and 3C, layers 82 of wicking material can be interposed between tablets 80 so that the wicking region extends radially with respect to the long axis of the structure. The tablets or pellets can be prepared by pressing a powder including the solid hydride. Referring to FIGS. 3A and 3B, a single channel 84 of wicking material extends along the length of the structure. The channels can be prepared by drilling or otherwise forming lengthwise holes in the pellet. Referring to FIGS. 3C-3E, multiple channels 86, for example, 2 to 8 channels, can be distributed around a tablets 80. Referring to FIG. 3F, a channel layer 88 of wicking material can surround the periphery of tablets 80. Referring to FIGS. 3E and 3F, a design in which the wicking material (channels 86 or channel layer 88) can allow void volume 90 to be incorporated into the generator design between housing 14 and tablets 80. The void volume 90 can be selected to accommodate the volume expansion that occurs to the pellet as hydrogen is generated.

By forming cylindrical pellets of solid hydride, it is possible to maximize utilization of can volume to produce hydrogen. For example, solid hydride powder can be pressed into a pellet that has an actual density that is nearly theoretical density for the material (>98% of the theoretical density of 1.074 g/cc for sodium borohydride. However, diffusion of water into and hydrogen out of a large dense pellet of material can be inefficient due to passivation of the hydride, bubbles captured in the pellet and pockets of water blocking hydrogen flow. This can be overcome by forming regions of hydrophilic and hydrophobic materials within or between the solid pellets. Wicking material can be used as a support for the catalyst. Fluid can then be wicked through the catalyst to dissolve it and initiate reaction with the chemical hydride. The relative dimensions of the regions can be selected such that the diffusion length of fluid into the solid hydride can be minimized as well as the volume that the wicking material displaces. Certain structures can allow lateral diffusion and axial diffusion of fluid simultaneously.

Figure 4A:
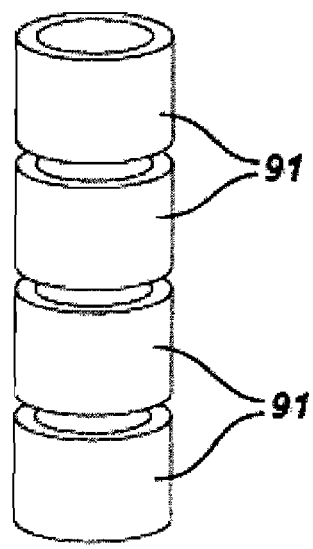
FIG. 4A is a perspective view of solid hydrogen source.
Figure 4B:
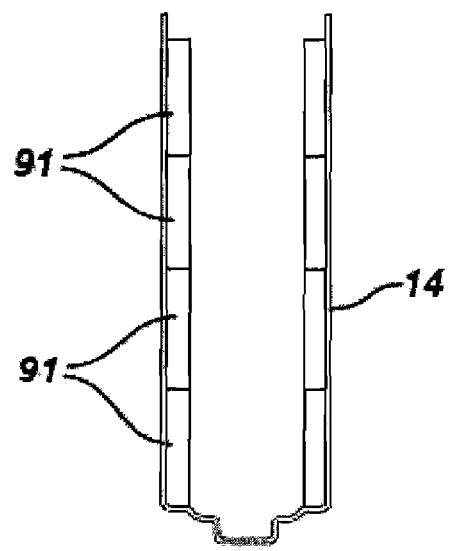
FIG. 4B is a side view of a solid hydrogen source in a housing.
Figure 5:
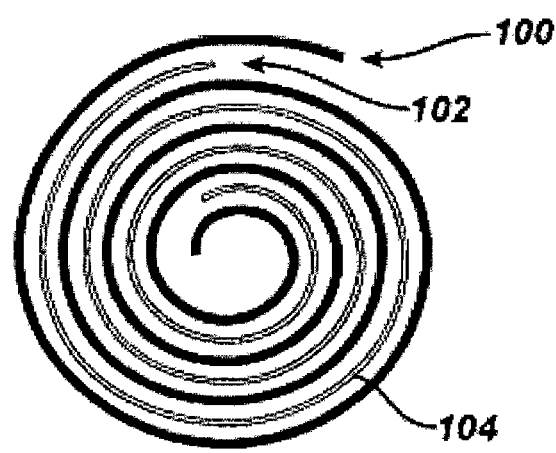
FIG. 5 is a top view of a layered solid hydrogen source.

In another example, the region of the hydrophilic material can form a layer adjacent to the region of the solid hydride. Referring to FIG. 4A, cylindrical pellets 91 of a solid hydrogen source can be formed by pressing a powdered material, such as a solid hydride. Referring to FIG. 4B, cylindrical pellets 91 can be stacked within a housing 14, and a hydrophilic material (not shown) can be introduced into the within or around the stack of cylinders. Referring to FIG. 5, the wicking region and the region of the solid hydride can form wicking layer 100 and hydride layer 102, which can be rolled to form a layered roll 104. For example, a layer of sodium borohydride can be dispersed as a powder rolled between hydrophilic/hydrophobic inert separators that would be used to direct water to the reactant to enable hydrogen generation. A single layer fuel tape can include sodium borohydride blended with a hydrophilic binder and an array of hydrophilic fibers. A tape made from this material can be made by a process akin to paper-making. The fuel tape (paper) can be rolled with a hydrophobic membrane to separate layers and allow for hydrogen to diffuse out. In such a system, catalyst can be dissolved in water, which could then be wicked into the roll from one end, or the catalyst can be incorporated into the tape or the separator layer.

More particularly, a tape consisting of the fuel/catalyst system can be fabricated by making a mixture of powdered solid hydride, which can have a uniform mesh size, and a hydrophilic binder in a suitable solvent. Both the binder and solvent have to be unreactive toward the solid hydride. Examples of an binder include coathylene or isobutylene. Possible solvents include heavy hydrocarbons such as Isopar G. The binder should be less than 10% w/w of the solid hydride. The solid hydride/binder/solvent mixture can be blended and rolled into flat sheets using a roll coater such as a Rondo coater to form a sheet of fuel tape. A separate sheet of hydrophilic cloth or wicking material can be impregnated with a cobalt chloride solution and allowed to dry to form a catalyst sheet which can be calendared together with the fuel tape to make the structure. By rolling under tension, this can make more active material available per unit volume. When the roll is placed in a cylindrical housing and water can contact the wicking material which in turn dissolves the catalyst and initiates reaction with the fuel tape. Hydrogen diffuses through the holes covered with hydrophobic material in end caps positioned at the ends of the roll. The number of hydrogen outlets and choice of membrane (based on hydrophobicity and gas permeability) can be selected to maximize hydrogen generation rate. Hydrogen yields of up 85% or more can be achieved. By distributing the fluid, the heat generated by the solid hydrogen source can be controlled and maintained at or near ambient temperature.

When the fluid includes water, it can be delivered to the solid hydrogen source in a liquid phase or a gas phase. When delivered in a gas phase, this approach can permit water to be delivered more efficiently to the solid hydrogen source predictably and reliably independent of geometric orientation of the device. For example, a small resistive heater can be included in generator that vaporizes liquid water in a reservoir prior to or while the water passes through the inlet. In another example, a membrane system can be utilized to enable controlled conversion of liquid water to vapor-phase water that is then directed into the solid hydrogen source. After the hydrogen generation begins, the heat generated from the hydrogen generation can be utilized to provide heat to vaporize liquid water, allowing resistive heating to be needed at the beginning of use.

Figure 6A:
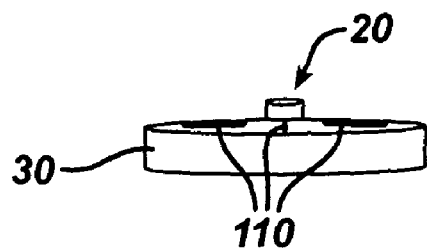
FIG. 6A is a side view of an end cap.
Figure 6B:
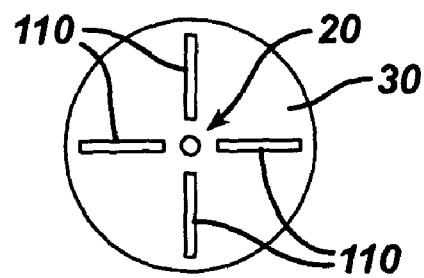
FIG. 6B is a top view of an end cap.
Figure 6C:
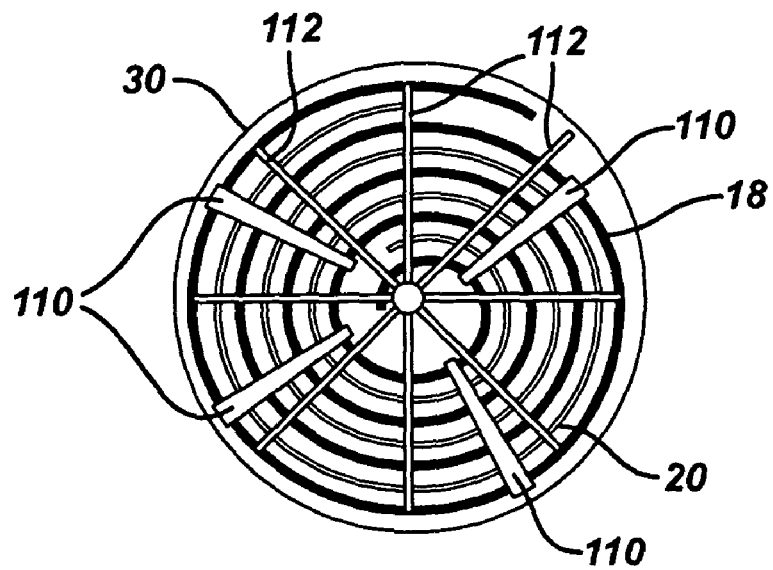
FIG. 6C is an end view of an end cap and solid hydrogen source.

End cap 30 can be designed to control the safety of the system and maximize utilization of the solid hydrogen source by distributing the fluid throughout the solid hydrogen source. In particular, end cap 30 can be designed to have a large contact area between the fluid and the solid hydrogen source, which can minimize the diffusion length of the fluid into the solid hydrogen source, improving overall hydrogen yield from the device. Referring to FIGS. 6A and 6B, end cap 30 includes the inlet 20 and hydrogen outlets 110. Hydrogen outlets 110 can be distributed over the area of the cap to maximize surface contact with the solid hydrogen source, which can facilitate collection of generated gas. As discussed previously, a gas permeable membrane, such as a hydrophobic membrane, can cover the hydrogen outlets to contain solids and liquids within the generator. Referring to FIG. 6C, end cap 30 can be positioned over an end of solid hydrogen source 18, depicted here as a layered roll. Hydrogen outlets 110 are positioned over the end of solid hydrogen source 18 to facilitate collection of generated hydrogen. Inlet 20 contact wicks 112, which can be grooves or conduits of wicking material on the contact side of cap 30. Wicks 112 can be patterned on the cap to distribute water in a geometrical pattern that evenly distributes the fluid as it is delivered to the solid hydrogen source. The wick can be patterned to minimize the radial arc lengths of fuel tape between the wicks.

Referring to FIG. 1, an electrochemical system 10 the hydrogen gas outlet 26 of hydrogen generator 12 is connected to a hydrogen fuel cell 50. The fuel cell 50 has a housing 52 defining an internal volume 54. Within the internal volume are an anode 56 and a cathode 58, separated by an electrolyte 60. The housing also has an oxygen or air inlet 62, an air and water outlet 64 through which oxygen-depleted air can also escape, and a hydrogen inlet 66. The hydrogen inlet 66 can be releasably connected to the hydrogen gas outlet 26 of the hydrogen generator 12. The connection between the hydrogen generator and the hydrogen fuel cell can provide a conduit for hydrogen gas. Thus, hydrogen gas produced by the hydrogen generator can travel to the fuel cell, where it can be consumed by fuel cell anode 56. The connection between the hydrogen generator and the fuel cell can be closed or opened as needed, using a valve or other means of regulating hydrogen flow to the fuel cell. A conductor 68 can connect anode 56 and cathode 58 to drive a load when current is produced.

In fuel cell 50, anode 56 oxidizes hydrogen gas to produce protons and electrons. The protons move through electrolyte 60 to cathode 58, where the protons combine with oxygen, provided through oxygen or air inlet 62, and electrons traveling through conductor 68 to produce water. The water can exit the fuel cell through air and water outlet 64. A feedback collection conduit (not shown) can collect water from the fuel cell cathode and feed the hydrogen generator. The anode 56 of the fuel cell can be formed of a material capable of interacting with hydrogen gas to form protons and electrons. The material can be any material capable of catalyzing the dissociation and oxidation of hydrogen gas. Examples of such materials include, for example, platinum or noble metals, platinum or noble metal alloys, such as platinum-ruthenium, and platinum dispersed on carbon black. Cathode 58 can be formed of a material capable of catalyzing the reaction between oxygen, electrons, and protons to form water. Examples of such materials include, for example, platinum, platinum alloys, transition metals, transition metal oxides, and noble metals dispersed on carbon black. Electrolyte 60 is capable of allowing ions to flow through it while also providing a substantial resistance to the flow of electrons. In some embodiments, electrolyte 60 is a solid polymer (e.g., a solid polymer ion exchange membrane). Electrolyte 60 can be a solid polymer proton exchange membrane (PEM). An example of a solid polymer proton exchange membrane is a solid polymer containing sulfonic acid groups. Such membranes are commercially available from E.I. DuPont de Nemours Company (Wilmington, Del.) under the trademark NAFION. Alternatively, electrolyte 60 can also be prepared from the commercial product GORE-SELECT, available from W.L. Gore & Associates (Elkton, Md.). In some cases, electrolyte 60 can be a polyphosphazine membrane, or a membrane including an inorganic filler. In some embodiments, electrolyte 60 can be an ionically conducting liquid electrolyte (e.g., aqueous potassium hydroxide solution, aqueous sodium hydroxide solution, aqueous sulfuric acid solution, or aqueous phosphoric acid solution). The liquid electrolyte can be a free liquid or it can be immobilized by the addition of a gelling agent, such as a polymer (e.g., polyacrylic acid or polymethacrylic acid), or an absorbing agent (e.g., silica gel, fumed silica, or clay).

Fuel cell housing 52 can be any conventional housing commonly used in fuel cells. For example, housing 52 can be a plastic, carbon, or metal container such as steel, stainless steel, graphite, nylon, polyvinyl chloride, polytetrafluoroethylene, polyvinylidene fluoride, perfluoroalkoxy resin, or a combination of metals, carbons, and plastics. Plastics may be filled, e.g., with mineral fillers. Alternatively, plastics may be unfilled. In some embodiments, the anode can include a pressure control valve that can regulate the hydrogen pressure in the cell.

The generation of hydrogen from the generator is controlled by controlling delivery of the fluid (such as water or water including dissolved catalyst) to the solid hydrogen source. More specifically, the inlet can be fluidly connected to a fluid control system configured to control fluid flow rate to the solid hydrogen source. The fluid can be mechanically fed into the solid hydrogen source. Referring to FIG. 7A, generator 12 can include fluid control system 200, in which fluid container 22 contains fluid chamber 202 and pressure chamber 204. Pressure chamber 204 is pre-pressurized with a gas, for example, an inert gas such as nitrogen, to a pressure $P_{N2}$. The pressure $P_{N2}$ in pressure chamber 204 is sufficient to transmit all of the fluid in fluid chamber 202 to the solid hydrogen source 18 through inlet 20 at a pressure ($P_{H2O}$) higher than the internal pressure of the housing 12 ($P_{H2\_IN}$). A piston or diaphragm 206 moves in response to the pressure differential. A pressure actuated valve (P), which can be a component of inlet 20, serves to self-regulate the internal hydrogen pressure ($P_{H2\_IN}$). A conformal buffer tank (BT) can accommodate expansion of the solid hydrogen source and sudden load changes, which lead to faster hydrogen consumption from the generator. Hydrogen delivery pressure to the fuel cell ($P_{H2\_OUT}$) is regulated to proper levels by a forward pressure regulator 210.

Referring to FIG. 7B, generator 12 can include fluid control system 200, in which fluid container 22 includes a piston or diaphragm 206 that is actuated by spring 208 to transfer the fluid to the solid hydrogen source 18. Spring 208 can be a compact belleville-washer stack with a non-linear force-displacement curve, which can deliver a relatively consistent force over the displacement range of the piston. A pressure actuated valve (P), which can be a component of inlet 20, serves to self-regulate the internal hydrogen pressure ($P_{H2\_IN}$). A conformal buffer tank (BT) can accommodate expansion of the solid hydrogen source and sudden load changes, which lead to faster hydrogen consumption from the generator. The void space around the spring can be used as BT volume, decreasing wasted space. Hydrogen delivery pressure to the fuel cell ($P_{H2\_OUT}$) is regulated to proper levels by a forward pressure regulator 210.

Referring to FIG. 7C, a gas-permeable membrane 32 at outlet 34 of the solid hydrogen source 18 can contain materials within container 36. Material in solid hydrogen source 18 expands as hydrogen is produced and exits outlet 34. The expansion of the material can actuate piston or diaphragm 206 toward fluid container 22, driving delivery of the fluid into the solid hydrogen source. A pressure actuated valve (P), which can be a component of inlet 20, serves to self-regulate the internal hydrogen pressure ($P_{H2\_IN}$). A conformal buffer tank (BT) can accommodate expansion of the solid hydrogen source and sudden load changes, which lead to faster hydrogen consumption from the generator. Hydrogen delivery pressure to the fuel cell ($P_{H2\_OUT}$) is regulated to proper levels by a forward pressure regulator 210. A check valve 209 can be included adjacent to P to prevent back flow. This approach can be more compact than systems that include mechanical moving parts.

In general, the hydrogen generator can be self-regulating, switching on and off in response to power demands. To accomplish self regulation, valve P can be configured as shown in FIGS. 8A and 8B. Referring to FIG. 8A, as hydrogen is consumed, the hydrogen pressure in the generator ($P_{H2\_IN}$) decreases and the valve 300 opens as piston 302 is actuated by spring 304 to initiate further hydrogen production by fluidly connecting the fluid container 22 and solid hydrogen source 18. Referring to FIG. 8B, an elastomeric diaphragm 306 can respond to the hydrogen pressure in the generator to open and close the fluid connection between fluid container 22 and solid hydrogen source 18. Referring to FIG. 8C, pressure actuated valve P can be combined with outlet pressure regulator 210 in an outlet pressure regulator/water control valve 310. Valve 310 can regulate the hydrogen generator pressure ($P_{H2\_IN}$) down to a lower, steady value feeding into the fuel cell ($P_{H2\_OUT}$). Valve 310 is normally open and thus as hydrogen flows, pressure builds up downstream of the valve. As outlet pressure ($P_{H2\_OUT}$) increases, it is transferred to the valve through sensing orifice 312, which causes spring 314 to be compressed, eventually sealing at seat 319. As hydrogen is consumed and outlet pressure drops, the force on the spring is reduced and the valve opens to let more hydrogen through. As hydrogen in the generator is depleted, $P_{H2\_IN}$ falls and the valve must open further to maintain $P_{H2\_OUT}$ at the desired level. When the valve opens almost completely, $P_{H2\_IN}$ is slightly greater that $P_{H2\_OUT}$, the inlet 20 is opened, allowing fluid to move from fluid container 22 into solid hydrogen source 18 to generate more hydrogen. The output pressure can be set using knob 318. Because the forward pressure regulator is a normally open valve, a separate on/off valve can be used just before the fuel cell to seal off hydrogen pressure and flow during periods of non-use. However, the pressure regulator will maintain the working pressure in the lines upstream of the on/off valve, which is useful for fast fuel cell start-up.

In an alternative approach, the solid hydride, preferably in a cylindrical tablet form to minimize the void volume, can be dropped into the water containing a catalyst to promote gas generation and the reaction efficiency. In this case, a runaway situation more easily avoided since the maximum achievable hydrogen pressure is determined by the tablet size. A stack of solid tablets can be stored in a spring-loaded compartment which can be actuated by a lowered hydrogen pressure to increase output.

Other embodiments are within the scope of the following claims.

What is claimed is:

1. A hydrogen generator comprising:
   a housing;
   a solid hydrogen source disposed within the housing, wherein the solid hydrogen source includes a wicking region and a region of a solid hydride, wherein the solid hydrogen source includes a solid hydride combined with a hydrophilic material; and
   an inlet configured to guide a fluid to contact the solid hydrogen source, wherein the inlet is fluidly connected to a fluid control system configured to control fluid flow rate to the solid hydrogen source, the fluid control system comprising a heater adapted to vaporize liquid directed to the solid hydrogen source.

2. The hydrogen generator of claim 1, wherein the solid hydride is a pellet, tablet, cylinder, layer, or tube.

3. The hydrogen generator of claim 1, wherein the solid hydride includes a borohydride.

4. The hydrogen generator of claim 3, wherein the borohydride is sodium borohydride.

5. The hydrogen generator of claim 1, wherein the hydrophilic material includes a catalyst.

6. The hydrogen generator of claim 1, wherein the solid hydrogen source is a blend of the hydrophilic material with the solid hydride.

7. The hydrogen generator of claim 1, wherein the inlet contacts a region of a hydrophilic material.

8. The hydrogen generator of claim 1, wherein the housing includes a hydrogen gas outlet.

9. The hydrogen generator of claim 8, wherein the hydrogen gas outlet includes a gas permeable membrane.

10. The hydrogen generator of claim 8, further comprising an end cap at one end of the housing including the inlet and the hydrogen gas outlet.

11. The hydrogen generator of claim 1, wherein the housing is cylindrical.

12. The hydrogen generator of claim 1, wherein the fluid includes water.

13. The hydrogen generator of claim 1, wherein the heater uses heat generated form hydrogen generation in the housing.

14. A hydrogen generator comprising:
   a housing;
   a solid hydrogen source disposed within the housing, wherein the solid hydrogen source includes a wicking region and a region of a solid hydride, wherein the wicking region includes a region of a hydrophilic material; and an inlet configured to guide a fluid to contact the solid hydrogen source, wherein the inlet is fluidly connected to a fluid control system configured to control fluid flow rate to the solid hydrogen source, the fluid control system comprising a heater adapted to vaporize liquid directed to the solid hydrogen source.

15. The hydrogen generator of claim 14, wherein the region of the hydrophilic material is a channel through the region of the solid hydride.

16. The hydrogen generator of claim 15, wherein the channel extends along a long axis of the housing.

17. The hydrogen generator of claim 15, wherein the channel extends along a radial axis of the housing.

18. The hydrogen generator of claim 14, wherein the region of the hydrophilic material forms a layer adjacent to the region of the solid hydride.

19. The hydrogen generator of claim 14, wherein the region of the hydrophilic material and the region of the solid hydride form a layered roll.

20. The hydrogen generator of claim 14 wherein the heater uses heat generated from hydrogen generation in the housing.

21. A hydrogen generator comprising:
a housing:
a solid hydrogen source disposed within the housing, wherein the solid hydrogen source includes a wicking region and a region of a solid hydride, wherein the solid hydrogen source includes a solid hydride combined with a hydrophilic material; and
an inlet configured to guide a fluid to contact the solid hydrogen source, wherein the inlet is fluidly connected to a fluid control system configured to control fluid flow rate to the solid hydrogen source the fluid control system comprises a membrane system adapted to enable a controlled conversion of the fluid from liquid to vapor.

22. A hydrogen generator comprising:
a housing;
a solid hydrogen source disposed within the housing, wherein the solid hydrogen source includes a wicking region and a region of a solid hydride, wherein the wicking region includes a region of a hydrophilic material; and
an inlet configured to guide a fluid to contact the solid hydrogen source, wherein the inlet is fluidly connected to a fluid control system configured to control fluid flow rate to the solid hydrogen source, the fluid control system comprises a membrane system adapted to enable a controlled conversion of the fluid from liquid to vapor.

* * * * *